Aug. 21, 1951
H. W. HAPMAN
2,564,688
SEALED FLIGHT CONVEYER
Filed Jan. 6, 1948
3 Sheets-Sheet 1
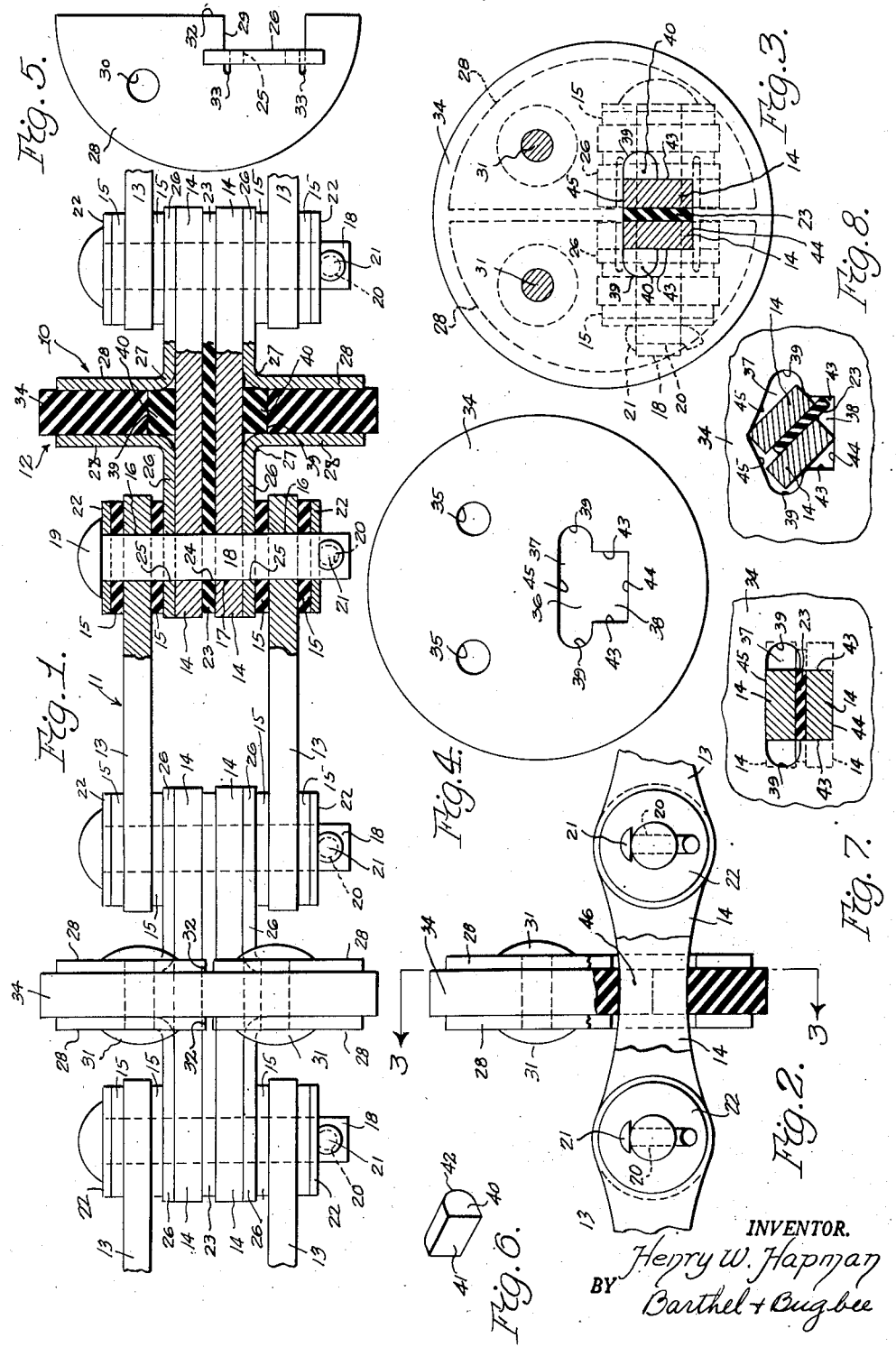
INVENTOR.
Henry W. Hapman
BY Barthel + Bugbee
ATTYS Aug. 21, 1951
H. W. HAPMAN
2,564,688
SEALED FLIGHT CONVEYER
Filed Jan. 6, 1948
3 Sheets-Sheet 2
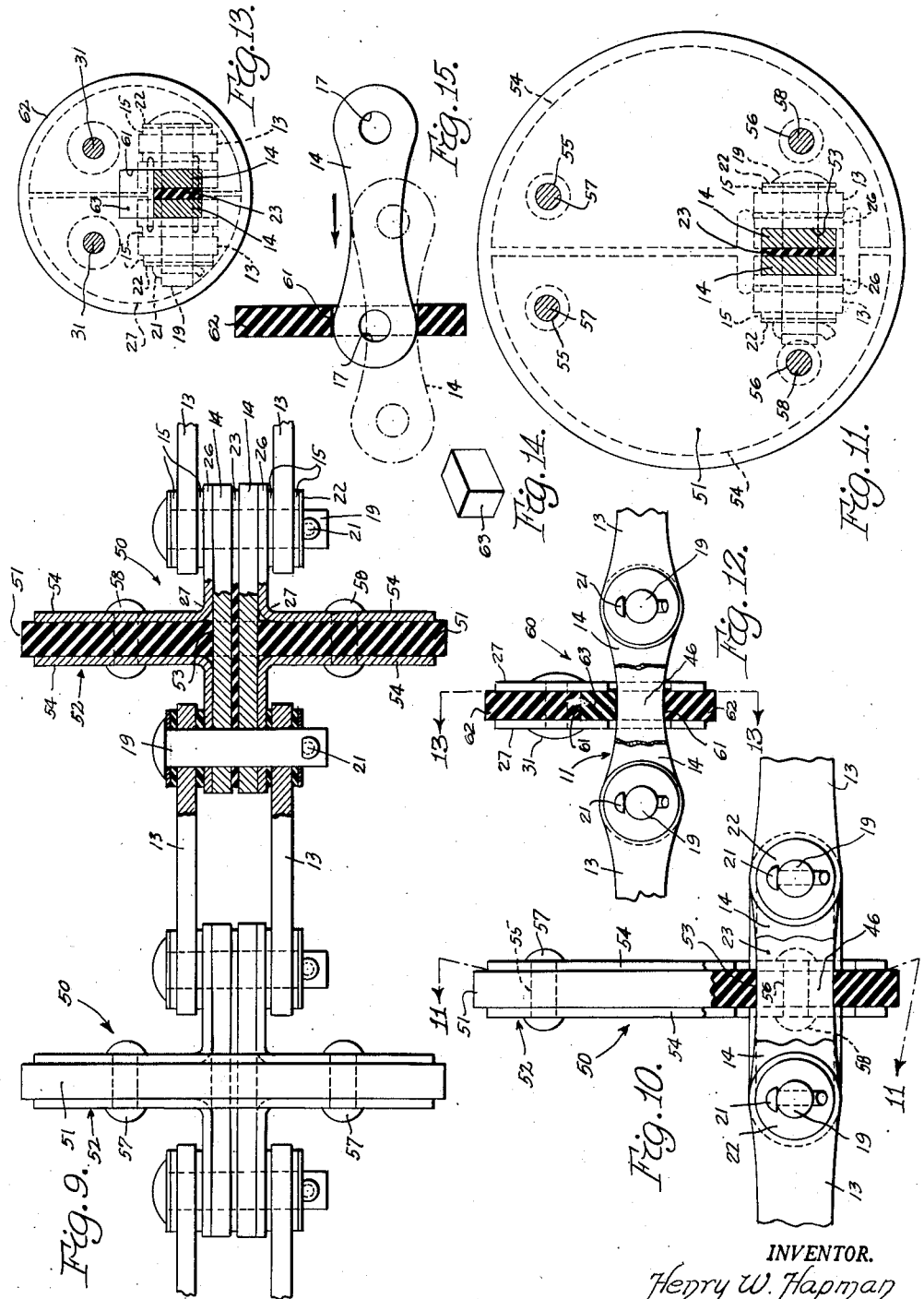
INVENTOR.
Henry W. Hapman
BY
Barthel & Bugbee
ATTYS

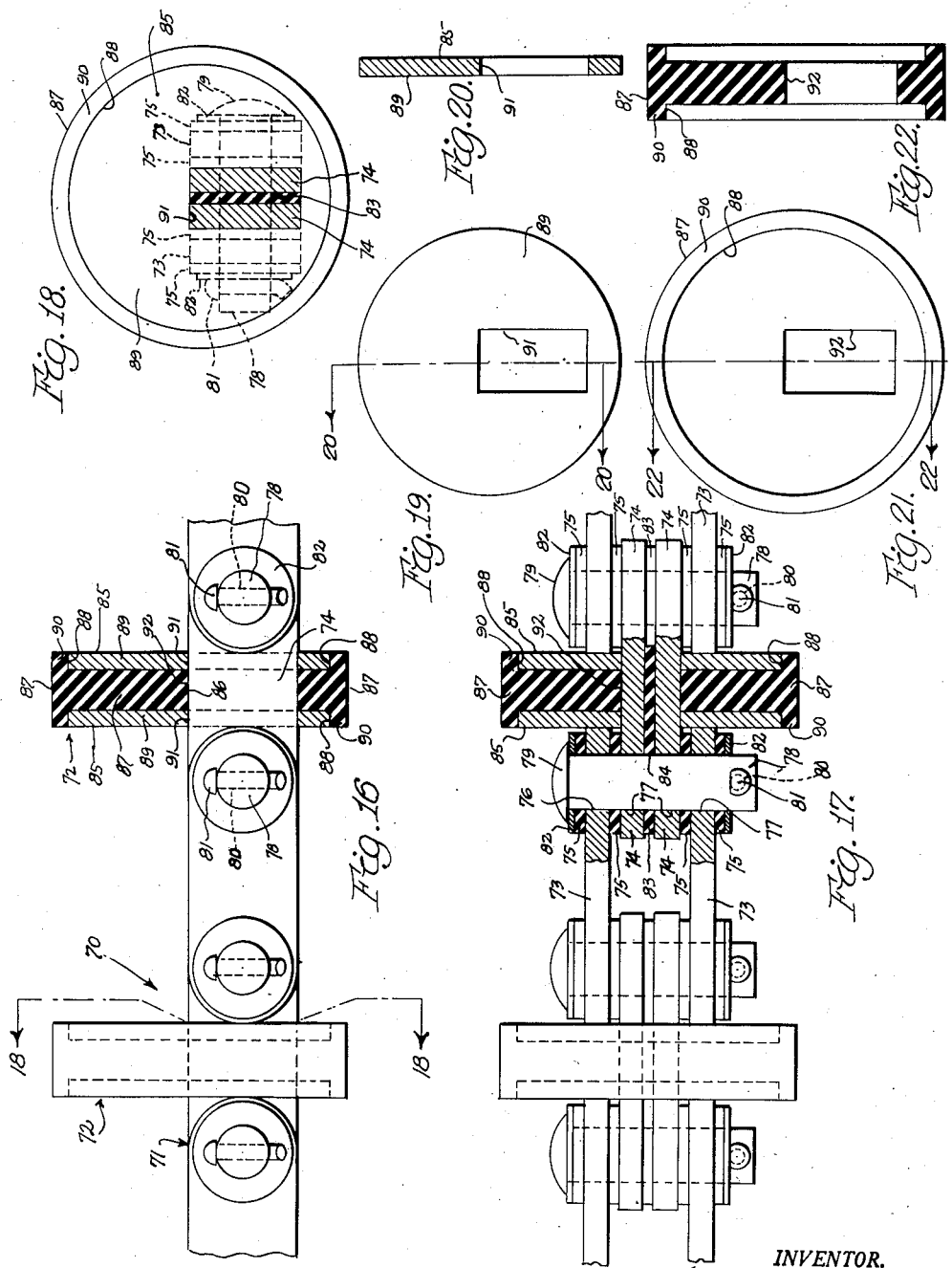

Patented Aug. 21, 1951

2,564,688

UNITED STATES PATENT OFFICE 2,564,688

SEALED FLIGHT CONVEYER

Henry W. Hapman, Detroit, Mich., assignor, by mesne assignments, of forty per cent to Hannah J. Hapman, Detroit, Mich.

Application January 6, 1948, Serial No. 664

14 Claims. (Cl. 198—176)

This invention relates to conveyors, and in particular to flight conveyors.

One object of this invention is to provide a flight conveyor wherein the flights are free from pockets or holes which would permit passage of air or liquid or which would serve as pockets for the material being conveyed.

Another object is to provide a flight conveyor wherein the flights are mounted on a conveyor chain with a substantially pressure-tight connection, so that leakage of air or material through the flights cannot occur.

Another object is to provide a flight conveyor wherein the flights are of resilient material such as rubber or synthetic rubber, and are mounted on the conveyor chain with a leakproof connection and with all recesses or openings carefully plugged so that no air or liquid can leak through the flights and no material collect in any recesses, the conveyor being thereby suitable for the transmission of food products since it is free from pockets which might harbor decaying food, bacteria, or other undesirable substances.

Another object is to provide a flight conveyor wherein the flights are provided with openings and the conveyor chain links are formed of such shapes and dimensions relatively to the openings that they may be inserted through the openings during assembly and portions of the openings not occupied by the links may then be plugged or otherwise filled to produce a pressure-tight connection therebetween.

Another object is to provide a flight conveyor of the foregoing type wherein the openings are of such size and shape that the conveyor chain links may be inserted through them and then turned in order to swing them into their proper positions relatively to the links, the remaining portions of the openings not occupied by the links being then plugged or otherwise sealed to provide a leakproof connection therebetween.

Another object is to provide a flight conveyor wherein the flights are of resilient material, such as rubber or synthetic rubber, and have reinforcing plates bonded to one or both sides of each flight, the links of the conveyor chain being inserted through an opening in each flight and its plate or plates so that the flight is firmly mounted on the chain between adjacent pivot pins, the outer links of the chain on opposite sides of the flight being preferably formed with their ends closely adjacent the reinforcing plates so as to hold the flights firmly in their proper positions on the chain.

In the drawings:

Figure 1 is a top plan view, partly in horizontal section, of a portion of a flight conveyor according to a preferred form of the invention;

Figure 2 is a side elevation, partly in vertical section, of a portion of the flight conveyor shown in Figure 1;

Figure 3 is a vertical section along the line 3—3 in Figure 2;

Figure 4 is a front elevation of one of the conveyor flight discs removed from the conveyor;

Figure 5 is a front elevation of one of the conveyor flight clamping plates removed from the conveyor;

Figure 6 is a perspective view of one of the plugs used for filling the opening in the flight disc after the chain links have been inserted and turned into their desired positions;

Figure 7 is a diagrammatic view of the central portion of Figure 3, showing the relative positions of the inner links after they have been inserted through the flight disc opening but before they have been turned into their proper positions;

Figure 8 is a diagrammatic view similar to Figure 7, but showing the positions of the links while they are being turned into their proper positions after being inserted through the flight disc opening;

Figure 9 is a top plan view, partly in horizontal section, of a modification of the flight conveyor shown in Figure 1, especially adapted for large diameter conduits;

Figure 10 is a side elevation, partly in section, of a portion of the flight conveyor shown in Figure 9;

Figure 11 is a vertical section along the line 11—11 in Figure 10;

Figure 12 is a side elevation, partly in vertical section, of a portion of a further modified flight conveyor;

Figure 13 is a vertical section along the line 13—13 in Figure 12;

Figure 14 is a perspective view of a plug used for sealing the conveyor flight disc opening in the further modified conveyor of Figures 12 and 13, after the chain links have been inserted through the opening;

Figure 15 is a diagrammatic vertical section through the further modified conveyor of Figures 12 and 13, showing the links of the conveyor chain being inserted through the flight disc opening;

Figure 16 is a side elevation, partly in vertical section, of a portion of a still further modified flight conveyor wherein reinforcing plates are bonded directly to the resilient flight discs and the chain links are inserted through openings therein;

Figure 17 is a top plan view, partly in horizontal section, of the flight conveyor shown in Figure 16;

Figure 18 is a vertical section along the line 18—18 in Figure 16;

Figure 19 is a front elevation of the reinforcing plate for the flight conveyor shown in Figure 16;

Figure 20 is a vertical section along the line 20—20 in Figure 19;

Figure 21 is a front elevation of a conveyor flight disc of resilient material used with the conveyor shown in Figures 16 and 17; and Figure 22 is a vertical section along the line 22—22 in Figure 21.

Referring to the drawings in detail, Figures 1 to 8 inclusive show a flight conveyor, generally designated 10, according to a preferred form of the invention, as consisting generally of a conveyor chain 11 having flights 12 mounted at intervals therealong. The chain 11 consists of outer and inner links 13 and 14 respectively spaced apart from one another by resilient washers 15 of rubber-like material and bored as at 16 and 17 respectively for the passage of pivot pins 18 having enlarged heads 19 at one end and transverse holes 20 for cotter pins or other fasteners 21. The pivot pins 18 also pass through washers 22 of metal or other suitable material arranged at opposite ends thereof adjacent the heads 19 and fasteners 21. Arranged between each pair of inner links 14 is an elongated spacing strip or resilient link 23 of rubber-like material which is bored as at 24 for the passage of the pivot pins 18 and which is approximately the same in outline as the links 14.

The pivot pins 18 also pass through holes 25 in the bent arms 26 of clamping plates 27 (Figure 5). The clamping plates 27 have clamping portions 28 of approximately semi-circular outline with an approximately rectangular cut away portion 29 therein for the passage of one of the links 14 and the spacing strip 23. The clamping plate 27 is also provided with a hole 30 for fasteners 31 such as rivets or bolts. The arms 26 are formed in part by slotting the clamping portions 28 inward from their inner edges 32 as at 33 (Figure 5) and bending the arm portions 26 into a position approximately perpendicular to the clamping portions 28 (Figures 1 and 5).

Four of the clamping plates 27 are preferably employed for each flight 12, in pairs of right-hand and left-hand arrangements as shown in Figure 1. Secured between the clamping portions 28 of the clamping plates 27 are resilient flight discs 34 (Figure 4) of rubber-like material, such as rubber or synthetic rubber, having holes 35 therethrough corresponding in location to the holes 30 in the clamping plates 27 and aligned therewith to receive the fasteners 31. In this manner, the flight discs 34 and their plugs 40 are clamped between the clamping portions 28 of the clamping plates 27. The flight discs 34 are also provided with approximately T-shaped openings 36 having horizontal elongated top portions 37 and narrowed rectangular bottom portions 38. The top portions 37 at their opposite ends are preferably provided with rounded end portions 39 which extend laterally outward beyond the portions 38. Plugs 40 of preferably the same material as the flight discs 34 (Figure 6) provided with flat and rounded opposite sides 41 and 42 respectively are also furnished in sizes adapted to fit snugly into the opening end portions 39 (Figure 4) so that the sides 41 in effect are aligned vertically with the side walls 43 of the lower opening portions 38 and in effect form continuations thereof. The opening portion 38 is also provided with a lower wall 44, whereas the opening portion 37 is provided with an upper wall 45.

In the assembly of the flight conveyor 10, an inner chain link 14 is first inserted in a horizontal position through the flight disc opening portion 37 and pushed through the opening until its narrower midportion 46 arrives in the opening. Since the narrow opening portion 38 is of slightly less width than the midportion 46 of the inner link 14, the latter can be pushed downward as shown in Figure 7, so that it lies horizontally within the opening portion 38. The resilient link or spacing strip 23 is then inserted in the same manner and similarly dropped into the opening portion 37. The second inner link 14 is then inserted in the same manner above the resilient link 23 and lying wholly within the upper opening portion 37. The workman then grasps the links 14 and 23 firmly and applies a torque to them so as to twist them from their horizontal positions of Figure 7 through the inclined positions of Figure 8, into the vertical positions of Figure 3.

As the links 14 and 23 are so turned, they slide relatively to one another and at the same time slightly deform the walls 43, 44 and 45 of the opening 36, as shown in Figure 8. When the links 14 and 23 reach their vertical positions (Figure 3), they fit snugly into the lower opening portions 38, and project upward into the upper opening portion 37. The workman now inserts a pair of the plugs 40 in the end portions 39 of the upper opening portion 37, forcing these into the openings so as to effectively seal the latter. The height of the opening 36 between the bottom and top walls 44 and 45 is also preferably made slightly less than the width of the intermediate portion 46 of the inner links 14 so that when the links reach the positions shown in Figure 3, the upper and lower walls 45 and 44 will closely hug the links 14. Since the side walls 43 are also spaced apart a distance slightly less than the combined thicknesses of the links 14 and 23, the side walls 43 also closely hug the sides of the inner links 14.

In so assembling the links 14 and 23 in the opening 36, the resilient link 23 is somewhat compressed laterally, so that it adds its resilience to the resilience of the flight discs 34 and plugs 40 in tightly sealing the links 14 and 23 in the opening 36 and providing a leak-proof and pressure-tight connection therebetween. In this manner, also, no food particles or other particles of the conveyed materials find crevices in which to lodge, with the result that the flight conveyor 10 may easily be maintained in a clean and sanitary condition.

The clamping plates 27 are then assembled on opposite sides of the flight discs 34 with their holes 30 aligned with the holes 35, the resilient washers 15 are applied (Figure 1), followed by the outer links 13 and outer washers 15 and 22. The pivot pin 18 is then inserted through the openings in the washers 15 and 22 and also through the holes 16, 17, 24 and 25 in the outer links 13, inner links 14, resilient links 23 and clamping plate arm portions 26 respectively. Ordinarily, the hole 20 for the cotter pin or other fastener 21 is placed somewhat closer to the head 19 than the combined thicknesses of the washers 15 and 22, links 13, 14 and 23 and clamping plate arm portions 26 so that the resilient washers 15 and resilient link or spacing strip 23 must be compressed laterally, in order to insert the fastener 21. By this arrangement, the pivot pin 18 is protected against the entrance of dirt, grit or other wear-producing substances, as these are automatically excluded by the resilient washers 15 and resilient links 23. By repeating the foregoing operations for each flight 12, the entire flight conveyor 10 is assembled, preferably into endless form.

In the operation of the invention, the flight conveyor 10 is, of course, threaded through a conduit system of the required path and is meshed with a driving sprocket (not shown) connected to conventional driving mechanism. Such conduits and driving mechanism are shown, for example, in the Hapman Patent 2,432,756, issued December 16, 1947. When power is applied to the driving sprocket, the flight conveyor 10 is caused to traverse the endless path in which it is arranged, receiving the material to be conveyed at one location and discharging it at another location. Thus, sludge may be removed from tanks, and loose material such as fly ash, grain, dust, machining chips or the like conveyed from place to place in a simple and effective manner requiring a minimum expenditure of power. In actual practice, the pivot pins of the chains are fitted very loosely in the holes in the links so that excessive clearances exist. By reason of the excessive clearances, the flight conveyor chain 11 may twist lengthwise as it proceeds around bends in the conveyor conduit or over sprockets. The eccentric mounting of the flights on the chains thereby causes the weight of the chain to tend to keep the flights upright during their travel along horizontal portions of their path. Since the flights are sealed snugly on the chain, no crevices exist where bacteria-forming food particles may collect, and the conveyor may be used in a vacuum or pressure system.

The modified flight conveyor, generally designated 50 shown in Figures 9, 10, and 11 is similar, for the most part to the principal form of the invention shown in Figures 1 to 8 inclusive, and similar parts are similarly designated by reference numerals. The latter, however, is especially well adapted to flight conveyors used in small to medium-sized conduits whereas the modification shown in Figures 9, 10 and 11 is particularly well adapted to flight conveyors wherein the flights are of relatively large diameters in proportion to the conveyor chain and are installed in relatively large conduits. Under such circumstances, the construction of the conveyor chain 11 remains substantially the same, except that the large diameter flight discs 51 of the flights 52 have more area in which to house the inner links 14 of the conveyor chain 11. For that reason, the inner links 14 of the conveyor chain 11 in Figure 10 do not have to be narrowed as much as their intermediate portions 46 as in Figure 2, because a larger opening 53 may be formed in the flight discs 51 than the opening 36 in the flight discs 34 (Figure 4). Furthermore, the inner links 14 may be pushed directly through the opening 53, which is therefore made rectangular rather than T-shaped, the rubber-like material of the disc yielding to momentarily enlarge the opening 53 while the slightly enlarged ends of the links 14 are pushed through it. The resilience of the material causes the disc 51 to close tightly around the links 14 as the latter reach their midportions 46, effecting a pressure-tight and liquid-tight junction.

The large diameter flights 52 employ clamping plates 54 which are in most respects similar to the clamping plates 27 of Figures 1 to 8 inclusive, except that upper and lower pairs of holes 55 and 56 with fasteners 57 and 58 are used (Figure 11) in place of the single pair of holes 35 and fasteners 31. The assembly of the modification shown in Figure 9, except as just described, follows the same procedure set forth in connection with Figures 1 to 8 inclusive. Since the material of the flight discs 51 yields as the inner links 14 are pushed through the rectangular openings 53, it is of course unnecessary to provide plugs to close any portion of the openings. The operation of the modification of Figures 9 to 11 inclusive is substantially the same as that of Figures 1 to 8 inclusive.

The modified flight conveyor 60 shown in Figures 12 to 15 inclusive is also for the most part similar to the principal form of the invention shown in Figures 1 to 8 inclusive, and similar parts are likewise similarly designated. In Figures 12 to 15 inclusive, however, a rectangular opening 61 is formed in each flight disc 62, the opening 61 being taller than the width of the intermediate portion 46 of the inner links 14 of the conveyor chain 11. The remainder of the construction is identical and employs identical clamping plates 27 between which the flight discs 62 are clamped by the fasteners 31. In order to fill the upper portion of the opening 61, however, after the inner links 14 have been inserted, plugs 63 of elastic deformable material are provided (Figure 14).

The assembly of the modified flight conveyor 60 is similar to that of the principal form of the invention shown in Figures 1 to 8 inclusive, except that the inner links 14 are pushed directly through the openings 61 as shown diagrammatically in Figure 15, without the necessity of turning or twisting the links 14. After the midportions 46 of the inner links 14 reach the openings 61, as shown by the chain lines in Figure 15, the plugs 63 of elastic deformable material are inserted in the portions of the openings 61 above the midportions 46, as shown in Figure 12. The plugs 63 are preferably made slightly larger than the space which they are intended to occupy, so that they are compressed slightly as they are forced into this space, forming a snug fit and effecting a gas-tight and liquid-tight junction between the links 14 and the flight discs 62. As in the case of the forms of the invention shown in Figures 1 and 9, the width of the opening 61 is made slightly less than that of the combined thickness of the inner links 14 and their resilient link 23 so that the latter will be compressed slightly to form a pressure-tight junction laterally. After the plugs 63 have been installed, the clamping plates 27 are then attached by means of the fasteners 31, securely and irremovably locking the plugs 63 in position. The operation of this modification is also substantially the same as previously described in connection with the other forms of the invention.

The modified flight conveyor 70 shown in Figures 16 to 22 inclusive also embodies the same principles as the forms 10, 50 and 60 previously described, but is especially adapted for use with very small diameter flights and conduits. Moreover, due to its simplicity of construction, it may be manufactured and sold at a very low price.

The conveyor 10 consists of a conveyor chain generally designated 71 and flights 72. The conveyor chain 71 consists of outer and inner links 73 and 74 respectively separated by resilient washers 75 and bored as at 76 and 77 respectively for the passage of pivot pins 78 having enlarged heads 79 at one end and transverse holes 80 for cotter pins or other fasteners 81. The pivot pins 78 also pass through washers 82 of metal or other suitable material arranged at opposite ends thereof adjacent the heads 79 and fasteners 81 (Figure 17). Arranged between each pair of inner links 74 is an elongated spacing strip or resilient link 83 of rubber-like material which is bored as at 84 for the passage of the pivot pins 78 and which is of approximately the same outline as the links 74.

In the flight conveyor 70, however, the clamping plates 85 are completely without arms corresponding to the arms 26 of Figures 1 and 5. Instead, the midportions 86 of the inner links 74 are of the same width as the ends thereof so that the opposite edges of the links 74 are substantially parallel. The flights 72 consist of discs 87 of elastic deformable material, such as rubber or synthetic rubber with cupshaped recesses 88 therein for receiving the circular clamping plates 89. The latter are preferably of metal, such as steel, and are bonded to the flight discs 87 during the molding of the latter. In other words, the plates 89 are placed in the mold and the rubber or synthetic rubber caused to fill the mold. Since the plates 89 are of smaller diameter than the flight discs 87, the marginal portions 90 project beyond the outer edges of the clamping plates 89 to form annular flanges.

The clamping plates 89 and flight discs 87 are provided with rectangular openings 91 and 92 respectively, the openings 92 in the flight discs being of slightly smaller size in cross-section than the cross-sectional size of the inner links 74 and resilient links 83. During assembly, the links 74 and 83 are pushed through the openings 91 and 92 in the clamping plates 89 and flight discs 87 until the flights 72 come to rest at the mid-points of the links 74. The spacing of the pivot pins 78 along the inner links 74 and the distances between the ends of adjacent outer links 73 are so chosen that the adjacent ends of the outer links 73 lie very close to or lightly engage the outer surfaces of the clamping plates 85, as shown in Figure 17. Thus, the adjacent ends of the outer links 73 serve as stops for accurately positioning the flights 72 at the midpoints of the inner links 74, and the edges of the spaced apertures 91 in the clamping plates 89 maintain the flights 72 upright on the chain 71. The operation of this modification is also substantially the same as that of the previously-described forms of the invention.

Thus, the present invention provides a flight conveyor with resilient flights of elastic deformable material such as rubber or synthetic rubber, these flights, while yielding under sufficient pressures, being also self-sustaining or self-supporting against moderate pressures, especially pressures applied in a lateral or transverse direction. This results from the fact that the rubber or synthetic rubber flight discs are of sufficient thickness at their edges to provide them with adequate rigidity to be self-supporting, yet at the same time to yield slightly in order to enable them to grip the conveyor chain tightly and also to engage the conveyor conduit snugly. The rigidity is of course enhanced by the presence of the clamping plates between which the flight discs are clamped, but the flight discs have sufficient rigidity and strength to sustain the pressure of a head of water such as when the conveyor is used to pump water or other liquid from one level to another. The conveyor of the present invention may be fitted into a conduit or a portion thereof with a neat or snug fit so that liquid may be pumped or considerable gas pressures sustained without excessive leakage. The flight construction also has sufficient lateral rigidity to sustain pressure when used with a self-sealing conduit of the resilient type shown in the Hapman application Serial No. 735,401, filed March 18, 1947, for Self-Sealing Conveyor Construction.

What I claim is:

1. A flight conveyor comprising an elongated conveyor chain having pivotally interconnected links and flights connected to said links in longitudinally-spaced relationship along said chain, said flights including discs of elastic deformable material with apertures therethrough for the passage of said links, said discs at the edges of said apertures snugly and yieldingly engaging the link portions passing therethrough and having sealed connections with said links.

2. A flight conveyor comprising an elongated conveyor chain having pivotally interconnected links and flights connected to said links in longitudinally-spaced relationship along said chain, said flights including discs of elastic deformable material with apertures of larger cross-sectional area than the cross-sectional areas of said links at their midportions, certain portions of said discs at the edges of said apertures snugly and yieldingly engaging a part of said link midportions and plugs inserted in said apertures adjacent said midportions, said plugs snugly and yieldingly engaging the remaining parts of said link midportions and having sealed connections with said links.

3. A flight conveyor comprising an elongated conveyor chain having pivotally interconnected links and flights connected to said links in longitudinally-spaced relationship along said chain, said flights including discs of elastic deformable material with elongated apertures of larger cross-sectional area than the cross-sectional areas of said links at their midportions, certain portions of said discs at the edges of said apertures snugly and yieldingly engaging a part of said link midportions and plugs inserted in said apertures adjacent said midportions, said plugs snugly and yieldingly engaging the remaining parts of said link midportions and having sealed connections with said links.

4. A flight conveyor comprising an elongated conveyor chain having pivotally interconnected links and flights connected to said links in longitudinally-spaced relationship along said chain, said flights including discs with approximately T-shaped apertures of larger cross-sectional area than the cross-sectional areas of said links at their midportions and plugs inserted in said apertures adjacent said midportions and having sealed connections with said links.

5. A flight conveyor comprising an elongated conveyor chain having pivotally interconnected links and flights connected to said links in longitudinally-spaced relationship along said chain, said flights including discs having sealed connections with said links, certain of said links being disposed in pairs passing through apertures in said flights and having spacers of elastic deformable material arranged between said pairs of links.

6. A flight conveyor comprising an elongated conveyor chain having interconnected pairs of outer and inner links, pivot elements pivotally interconnecting said links, spacers of elastic deformable material arranged between said pairs of inner links, and flights connected to said inner links and having apertures therethrough for the passage of said links, said flights being arranged in longitudinally-spaced relationship along said chain and having sealed connections with said inner links.

7. A flight conveyor comprising an elongated conveyor chain having interconnected pairs of outer and inner links, pivot elements pivotally interconnecting said links, spacers of elastic deformable material arranged between said pairs of inner links, and flights connected to said inner links and having apertures therethrough for the passage of said links, said flights being arranged in longitudinally-spaced relationship along said chain and having sealed connections with said inner links, said flights including clamping members secured to said pivot elements and also including discs and fasteners securing said discs to said members.

8. A flight conveyor comprising an elongated conveyor chain having interconnected pairs of outer and inner links, pivot elements pivotally interconnecting said links, spacers of elastic deformable material arranged between said pairs of inner links, and flights connected to said inner links and having apertures therethrough for the passage of said links, said flights being arranged in longitudinally-spaced relationship along said chain and having sealed connections with said inner links, said flights having laterally-elongated apertures therethrough for the passage of said inner links and plugs filling in the spaces between said inner links and the edges of said apertures.

9. A flight conveyor comprising an elongated conveyor chain having interconnected pairs of outer and inner links, pivot elements pivotally interconnecting said links, spacers of elastic deformable material arranged between said pairs of inner links, and flights connected to said inner links and having apertures therethrough for the passage of said links, said flights being arranged in longitudinally-spaced relationship along said chain and having sealed connections with said inner links, said flights including discs of elastic deformable material with apertures therethrough of slightly less cross-sectional area that the cross-sectional area of said links for the passage of said inner links, the edges of said apertures yieldingly engaging said inner links.

10. A flight conveyor comprising an elongated conveyor chain having interconnected pairs of outer and inner links, pivot elements pivotally interconnecting said links, spacers of elastic deformable material arranged between said pairs of inner links, and flight connected to said inner links and having apertures therethrough for the passage of said links, said flights being arranged in longitudinally-spaced relationship along said chain and having sealed connections with said inner link, said flights being mounted on said inner links between the ends of said outer links and in close proximity thereto.

11. A flight conveyor comprising an elongated conveyor chain having interconnected pairs of outer and inner links, pivot elements pivotally interconnecting said links, spacers of elastic deformable material arranged between said pairs of inner links, and flights connected to said inner links and having apertures therethrough for the passage of said links, said flights being arranged in longitudinally-spaced relationship along said chain and having sealed connections with said inner links, said flights comprising clamping plates and flight discs secured between pairs of such plates, said discs and plates having apertures therethrough for the passage of said inner links.

12. A flight conveyor comprising an elongated conveyor chain having interconnected pairs of outer and inner links, pivot elements pivotally interconnecting said links, spacers of elastic deformable material arranged between said pairs of inner links, and flights connected to said inner links and having apertures therethrough for the passage of said links, said flights being arranged in longitudinally-spaced relationship along said chain and having sealed connections with said inner links, said flights comprising clamping plates and flight discs secured between pairs of such plates, said discs and plates having apertures therethrough for the passage of said inner links, said flights being mounted on said inner links between the ends of said outer links and in close proximity thereto.

13. A flight conveyor comprising an elongated conveyor chain having interconnected pairs of outer and inner links, pivot elements pivotally interconnecting said links, spacers of elastic deformable material arranged between said pairs of inner links, and flights connected to said inner links and having apertures therethrough for the passage of said links, said flights being arranged in longitudinally-spaced relationship along said chain and having sealed connections with said inner links, said flights comprising clamping plates and flight discs secured between pairs of such plates, said discs and plates having apertures therethrough for the passage of said inner links, said discs being of elastic deformable material and said plates being bonded to said discs in substantially inseparable relationship.

14. A flight conveyor comprising an elongated conveyor chain having pivotally interconnected links and flights connected to said links in longitudinally-spaced relationship along said chain, said flights including discs with approximately T-shaped apertures of larger cross-sectional area than the cross-sectional areas of said links at their midportions, certain of said links passing through said apertures.

HENRY W. HAPMAN.

REFERENCES CITED

The following references are of record in the file of this patent:

UNITED STATES PATENTS

| Number | Name | Date |
|---|---|---|
| 538,057 | Willson | Apr. 23, 1895 |
| 733,965 | Horst | July 21, 1903 |
| 2,429,549 | Hapman | Oct. 21, 1947 |